US006947972B2

(12) United States Patent
Chun

(10) Patent No.: US 6,947,972 B2
(45) Date of Patent: Sep. 20, 2005

(54) ALARM MANAGEMENT SYSTEM AND METHOD THEREOF FOR NETWORK MANAGEMENT SYSTEM

(75) Inventor: Eung-Sun Chun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 879 days.

(21) Appl. No.: 09/839,152

(22) Filed: Apr. 23, 2001

(65) Prior Publication Data

US 2002/0099786 A1 Jul. 25, 2002

(30) Foreign Application Priority Data

Dec. 1, 2000 (KR) ........................................ 2000-72604

(51) Int. Cl.[7] .............................................. G06F 9/00
(52) U.S. Cl. ...................... 709/215; 709/200; 709/201; 709/224
(58) Field of Search ................................ 709/215, 200, 709/201, 224; 707/100, 200

(56) References Cited

U.S. PATENT DOCUMENTS

| 5,621,383 | A | 4/1997 | Yoshiyama |
| 5,696,486 | A | 12/1997 | Poliquin et al. |
| 5,768,501 | A | 6/1998 | Lewis |
| 5,777,549 | A | 7/1998 | Arrowsmith et al. |
| 6,040,770 | A | 3/2000 | Britton |
| 6,057,757 | A | 5/2000 | Arrowsmith et al. |
| 6,064,304 | A | 5/2000 | Arrowsmith et al. |
| 6,138,249 | A | 10/2000 | Nolet |
| 6,414,595 | B1 * | 7/2002 | Scrandis et al. ............ 340/506 |
| 6,564,341 | B1 * | 5/2003 | Sundaram et al. ............ 714/43 |
| 6,697,970 | B1 * | 2/2004 | Chisholm ..................... 714/48 |
| 2002/0069199 | A1 * | 6/2002 | Kang ............................. 707/9 |

* cited by examiner

Primary Examiner—Kimberly McLean-Mayo
(74) Attorney, Agent, or Firm—Robert E. Bushnell, Esq.

(57) ABSTRACT

There is provided a system and method for storing alarm information generated from a network, and for transmitting the alarm information to a plurality of alarm managers. An alarm management process in an alarm management host computer creates an uncleared alarm table for storing alarm information that was generated from the network and is not cleared yet, and a cleared alarm table for storing cleared alarm information. The alarm managers connected to the alarm management host computer create their respective listener tables. When an alarm is generated from the network, the alarm information is stored in the uncleared alarm table, and when the alarm is released, the alarm information is cleared from the uncleared alarm table and moved to the cleared alarm table. The alarm information is also stored in the listener tables. The alarm managers read the alarm information from their listener tables and display it. Therefore, load produced during searching for alarm information is distributed, increasing the speed and efficiency of the alarm information search.

65 Claims, 5 Drawing Sheets

ALARM MANAGEMENT SYSTEM AND METHOD THEREOF FOR NETWORK MANAGEMENT SYSTEM

CLAIM OF PRIORITY

This application claims priority to an application entitled "SYSTEM AND METHOD FOR MANAGING ALARM IN NETWORK MANAGEMENT SYSTEM" filed in the Korean Industrial Property Office on Dec. 1, 2000 and assigned Ser. No. 2000-72604, the contents of which are hereby incorporated by reference.

BACKGROUND OF THE INVENTION

1. Technical Field

The present invention relates generally to a network management system (NMS), and in particular, to a system and method for storing alarm information generated from a network and transferring the alarm information to a plurality of alarm managers.

2. Related Art

A network management system can monitor the state of a communication network all of the time in order to maintain the network in an optimal states, and can collect network state information, alarm information, and traffic data. When network alarm information is not handled efficiently, there can be inconvenience and difficulty.

There is a need to efficiently handle network alarm information. Exemplars of recent efforts include U.S. Pat. No. 6,040,770 to Britton, entitled COMMUNICATION PATH INTEGRITY SUPERVISION IN A NETWORK SYSTEM FOR AUTOMATIC ALARM DATA COMMUNICATION, issued on Mar. 21, 2000, U.S. Pat. No. 5,621,383 to Yoshiyama, entitled RING NETWORK SYSTEM CAPABLE OF DETECTING AN ALARM IN EACH NODE, issued on Apr. 15, 1997, U.S. Pat. No. 6,064,304 to Arrowsmith et al., entitled METHOD AND APPARATUS FOR POLICY-BASED ALARM NOTIFICATION IN A DISTRIBUTED NETWORK MANAGEMENT ENVIRONMENT, issued on May 16, 2000, U.S. Pat. No. 6,057,757 to Arrowsmith et al., entitled METHOD AND APPARATUS FOR POLICY-BASED ALARM NOTIFICATION IN A DISTRIBUTED NETWORK MANAGEMENT ENVIRONMENT, issued on May 2, 2000, U.S. Pat. No. 5,777,549 to Arrowsmith et al., entitled METHOD AND APPARATUS FOR POLICY-BASED ALARM NOTIFICATION IN A DISTRIBUTED NETWORK MANAGEMENT ENVIRONMENT, issued on Jul. 7, 1998, U.S. Pat. No. 5,696,486 to Poliquin et al., entitled METHOD AND APPARATUS FOR POLICY-BASED ALARM NOTIFICATION IN A DISTRIBUTED NETWORK MANAGEMENT ENVIRONMENT, issued on Dec. 9, 1997, U.S. Pat. No. 5,768,501 to Lewis, entitled METHOD AND APPARATUS FOR INTER-DOMAIN ALARM CORRELATION, issued on Jun. 16, 1998, and U.S. Pat. No. 6,138,249 to Nolet, entitled METHOD AND APPARATUS FOR MONITORING COMPUTER SYSTEMS DURING MANUFACTURING, TESTING AND IN THE FIELD, issued on Oct. 24, 2000.

While these recent efforts provide advantages, I note that they fail to adequately provide a method for efficiently and conveniently handling network alarm information.

SUMMARY OF THE INVENTION

It is, therefore, an object of the present invention to provide an alarm management system and a method thereof for a network management system, wherein alarm information generated from a network is managed in multiple distributed tables.

It is another object of the present invention to provide a system and method for transferring alarm information stored in multiple distributed tables among alarm managers by broadcasting and polling.

To achieve the above objects and others, there is provided an alarm management system and a method thereof in a network management system. According to one aspect of the present invention, a management information system (MIS) notifies an alarm management host computer that an alarm is generated from a network in the alarm management system. The alarm management host computer manages the alarm information received from the management information system. A plurality of alarm managers are connected to the alarm management host computer. The alarm management host computer has an uncleared alarm table storage for storing uncleared alarm information, a cleared alarm table storage for storing cleared alarm information, and an alarm management processor for controlling the generated alarm information to be stored in the uncleared alarm table storage, to be cleared from the uncleared alarm table storage when the alarm is released, and then to be stored in the cleared alarm table storage.

According to another aspect of the present invention, an alarm management processor creates an uncleared alarm table for storing alarm information that was generated from a network and is not cleared yet, and a cleared alarm table for storing cleared alarm information in the alarm management method. Then, the alarm management processor creates a plurality of listener tables corresponding to alarm managers connected to the alarm management processors and registers the listener tables in a broadcasting list table. Upon generation of alarm information from a network, the alarm management processor stores alarm information in the uncleared alarm table and the listener tables registered in the broadcasting list table. The alarm managers read the alarm information from the listener tables. When the alarm is released, the alarm management processor clears the alarm information from the uncleared alarm table and stores the alarm information in the cleared alarm table.

To achieve these and other objects in accordance with the principles of the present invention, as embodied and broadly described, the present invention provides an apparatus comprising: a management information system for outputting alarm information corresponding to an alarm event, and for outputting an alarm clear signal corresponding to an end of said alarm event; an alarm management host receiving said alarm information, said host having a broadcasting list data table, said host having an alarm database including a first data table and a second data table, said host having a plurality of memory spaces and a plurality of listener tables; a processor coupled to said host, said processor storing said alarm information in said first data table when said alarm information is received by said host, said processor removing said alarm information from said first data table and storing said alarm information in said second data table when said alarm event is cleared, said alarm event being cleared when said alarm clear signal is output; and a plurality of alarm managers connected to said host, said plurality of alarm managers including a first alarm manager, said listener tables including a first listener table corresponding to said first alarm manager, each of said listener tables having a unique name listed in said broadcasting list data table, said first listener table having a first unique name; said processor storing said alarm information in each of said listener tables listed in said broadcasting list data table; after said storing of said alarm information in said listener tables is completed, said alarm managers reading said alarm information stored in said respective listener tables; when said reading of said alarm information is performed, said alarm managers performing at least one selected from among displaying said alarm information, printing said alarm information, transmitting an e-mail message including said alarm information, transmitting a pager message including said alarm information, and transmitting a facsimile message including said alarm information; when said reading of said alarm information is performed, said alarm managers removing said alarm information from said listener tables to prevent re-reading of said alarm information; when said management information system performs said outputting of said alarm clear signal, said processor performing said removal of said alarm information from said first data table and performing said storing of said alarm information in said second data table.

To achieve these and other objects in accordance with the principles of the present invention, as embodied and broadly described, the present invention provides a method comprising the steps of: outputting alarm information corresponding to an alarm event and outputting an alarm clear signal corresponding to an end of said alarm event, said outputting being performed by a network; receiving said alarm information, said receiving being performed by a host, said host having a broadcasting list data table, a plurality of memory spaces, a plurality of listener tables, and an alarm database including a first data table and a second data table; when said alarm information is received by said host, storing said alarm information in said first data table; when said alarm event is cleared, removing said alarm information from said first data table and storing said alarm information in said second data table, said alarm event being cleared in response to said outputting of said alarm clear signal; connecting a plurality of alarm managers to said host, said plurality of alarm managers including a first alarm manager, said listener tables including a first listener table corresponding to said first alarm manager, each of said listener tables having a unique name listed in said broadcasting list data table, said first listener table having a first unique name; storing said alarm information in each of said listener tables listed in said broadcasting list data table; after said storing of said alarm information in said listener tables is completed, reading said alarm information stored in said listener tables, said reading of said alarm information stored in said listener tables corresponding to each one of said respective alarm managers reading said alarm information stored in each one of said respective listener tables; when said reading of said alarm information is performed by said alarm managers, performing at least one selected from among displaying said alarm information, printing said alarm information, transmitting an e-mail message including said alarm information, transmitting a pager message including said alarm information, and transmitting a facsimile message including said alarm information; when said reading of said alarm information is performed, removing said alarm information from said listener tables to prevent re-reading of said alarm information; and when said management information system performs said outputting of said alarm clear signal, performing said removal of said alarm information from said first data tables and performing said storing of said alarm information in said second data table.

To achieve these and other objects in accordance with the principles of the present invention, as embodied and broadly described, the present invention provides an alarm management method for a network management system, the method comprising the steps of: creating an uncleared alarm table for storing alarm information that is generated from a network and that is not cleared, and creating a cleared alarm table for storing alarm information that is cleared; storing first alarm information in the uncleared alarm table when the first alarm information is generated from the network, said first alarm information corresponding to an alarm event; and when the alarm event ends, removing said first alarm information from the uncleared alarm table and storing the first alarm information in the cleared alarm table.

To achieve these and other objects in accordance with the principles of the present invention, as embodied and broadly described, the present invention provides an alarm management method for managing an alarm in a network, said method comprising the steps of: creating a plurality of listener data tables for storing information, each one of said listener data tables corresponding to one respective alarm manager selected from among a plurality of alarm managers, each one of said listener data tables having a unique name; detecting whether said alarm managers are operating normally; registering in a broadcasting list data table said unique names identifying said listener data tables corresponding to said alarm managers that are detected to be operating normally; when an alarm event is generated in said network, storing first alarm information in said listener data tables corresponding to said names registered in said broadcasting list data table; and reading said first alarm information from said listener data tables by said corresponding alarm managers.

To achieve these and other objects in accordance with the principles of the present invention, as embodied and broadly described, the present invention provides an alarm management method for an alarm management processor connected to a plurality of alarm managers, the method comprising the steps of: creating an uncleared alarm table for storing alarm information corresponding to an alarm event that is generated from a network and that is not cleared, and creating a cleared alarm table for storing alarm information corresponding to an alarm event that is cleared; creating a plurality of listener tables corresponding to the alarm managers; registering the listener tables in a broadcasting list table, storing alarm information in the uncleared alarm table when the alarm event is generated from the network; storing the alarm information in the listener tables registered in the broadcasting list table; reading the alarm information from the listener tables. said reading being performed by the alarm managers; and when the alarm event is released, clearing the alarm information from the uncleared alarm table and storing the alarm information in the cleared alarm table.

To achieve these and other objects in accordance with the principles of the present invention, as embodied and broadly described, the present invention provides an apparatus for managing an alarm event occurring in a network, said apparatus comprising: a management information system for outputting alarm information corresponding to an alarm event; an alarm management host computer for managing said alarm information received from said management information system; and a plurality of alarm managers connected to said alarm management host computer, said plurality of alarm managers reading said alarm information when said alarm information is not cleared, said plurality of alarm managers including a first alarm manager; said alarm management host computer having a first data table for storing said alarm information when said alarm information is not cleared, and a second data table for storing said alarm information when said alarm information is cleared, said alarm management host computer storing said alarm information in said first data table when said alarm information is not cleared, said alarm management host computer removing said alarm information from said first data table and storing said alarm information in said second data table when said alarm information is cleared, said alarm information being cleared when said alarm event ends.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

In the interest of clarity, not all features of an actual implementation are described. In the following description, well-known functions or constructions are not described in detail since they would obscure the invention in unnecessary detail. It will be appreciated that, in the development of any actual embodiments numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

A network alarm management system stores plural pieces of alarm information generated from the network and transfers the alarm information to a plurality of alarm management computers connected to the network alarm management system.

Figure 1:
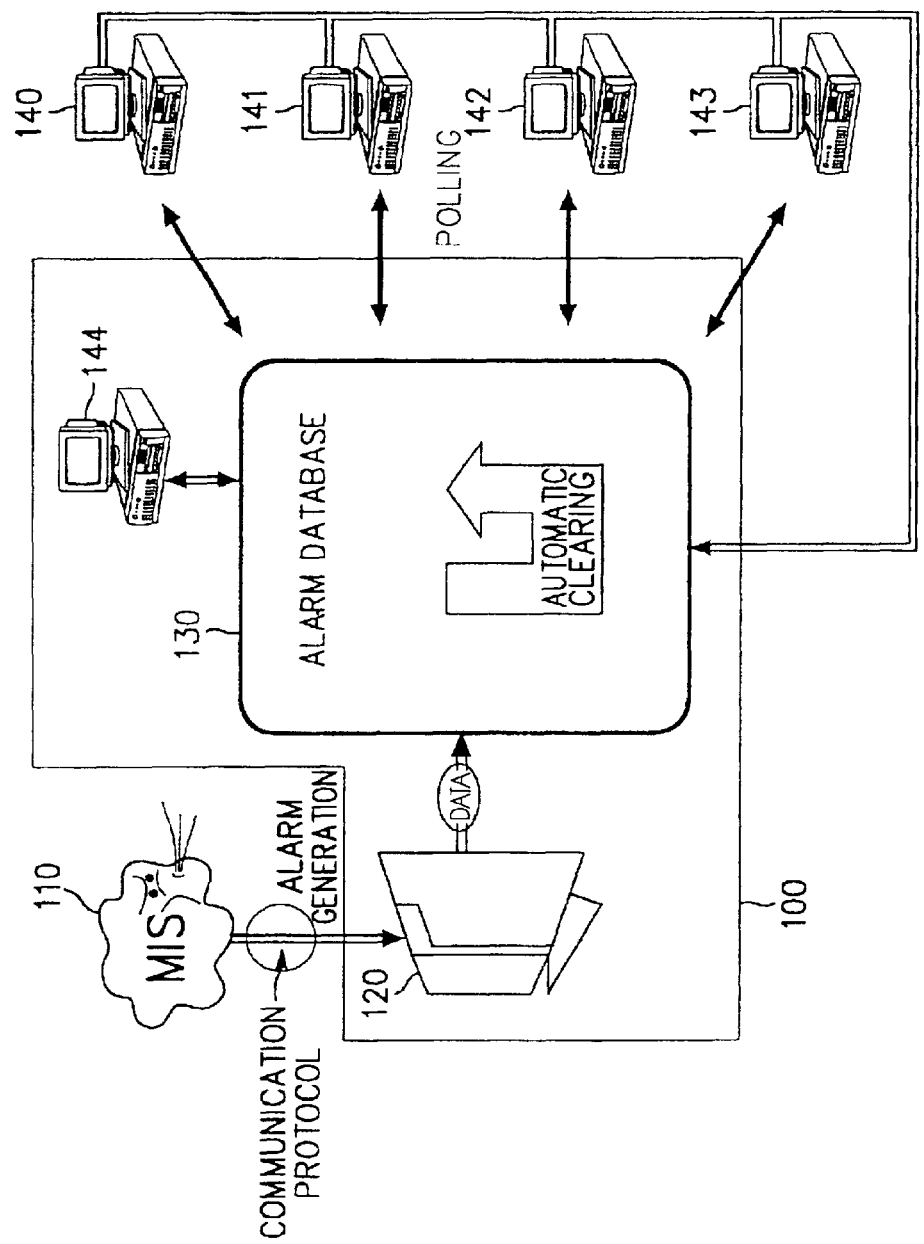
FIG. 1 is a block diagram of an alarm management system.

FIG. 1 is a block diagram of a network alarm management system. Referring to FIG. 1, a computer-based management information system (MIS) 110 collects state information generated from a network. The management information system 110 is a system that includes computer hardware, software, data, procedures, and people as its components, and processes data generated from the network and produces diverse pieces of information. Especially, upon notification of generation of an alarm event from the management information system 110, an alarm management processor 120 of an alarm management host computer 100 stores information about the alarm event in a predetermined form in an alarm database 130 formatted as a single structural table. A plurality of alarm managers 140 to 144 displays uncleared alarm information in real time, referring to the alarm database 130. An alarm event can be an error that occurs during a data transmission, a quantity of errors exceeding a predetermined amount, a network component failing to respond to polling, or any other type of fault condition.

In the above alarm management method, cleared alarm information and uncleared alarm information are stored without discrimination in a single alarm table. Therefore, when an alarm is cleared, an operator must clear corresponding alarm information referring to the entire alarm table, expending much effort and time.

The operation of many alarm managers causes a heavy load on the single alarm table when they refer to the table. Consequently, the performance of the alarm managers is remarkably decreased, and alarm history is reviewed at a lower speed. In addition, since all of the alarm managers share the single alarm table, an alarm management application program should be developed to search the alarm table every time a new NMS is implemented.

Figure 2:
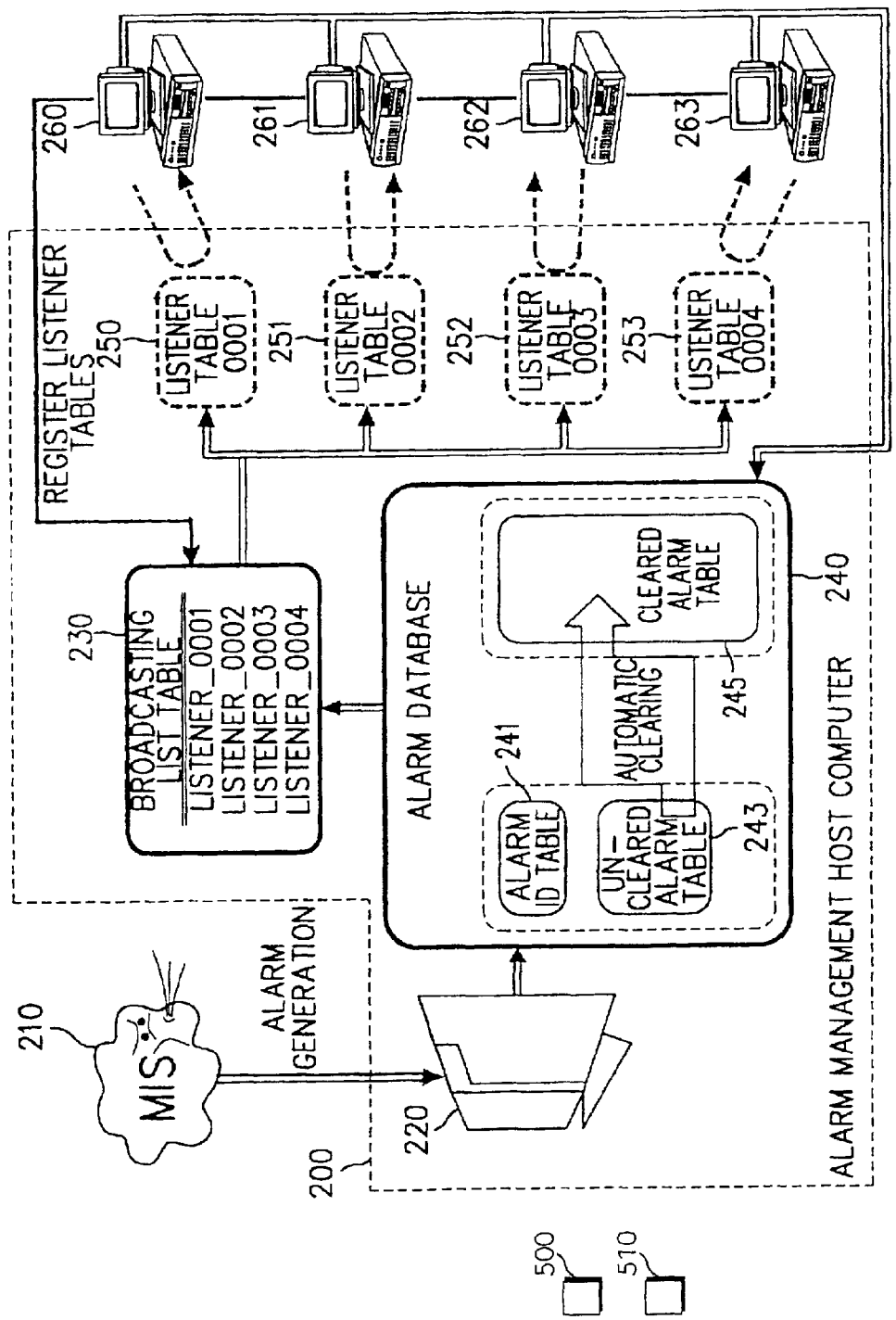
FIG. 2 is a block diagram of an alarm management system in accordance with the principles of the present invention.

FIG. 2 is a block diagram of an alarm management system according to the present invention. Referring to FIG. 2, an alarm management host computer 200 is a workstation for managing a network, and includes an alarm management processor 220, a broadcasting list table 230, an alarm database 240, and a plurality of listener tables 250 to 253.

The alarm management processor 220 operates according to an alarm management application program which is a daemon application program. As is known, a daemon is a resident program that executes computer system-associated operations in the background. That is, when a task to be processed occurs, the alarm management daemon is automatically invoked from the background and implements the task. A daemon is a program that is not invoked explicitly, but lies dormant waiting for some condition to occur.

The alarm database 240 of a multiple distributed table structure includes an alarm identifier (ID) table 241, an uncleared alarm table 243, and a cleared alarm table 245. The alarm management processor 220 of the host computer 200 stores alarm information that was generated from the network and is not cleared yet in the uncleared alarm table 243, and if the alarm information is cleared, it clears the alarm information from the uncleared alarm table 243 and stores the alarm information in the cleared alarm table 245.

The alarm management processor 220 is connected to workstations, personal computers (PCs), or a plurality of alarm managers 260 to 263 that run in an application program of the alarm management processor 220 in order to support distributed alarm management of plural operators. Unless the alarm managers 260 to 263 read alarm information from the uncleared alarm table 243 at a synchronous time, some alarm managers may read cleared alarm information earlier and other alarm managers may read only uncleared alarm information later. In this case, the alarm managers may have different alarm information.

To prevent this problem, the alarm managers 260 to 263 each secure unique alarm information sensing areas, specifically, listener tables 250 to 253. The names of the listener tables 250 to 253 are registered in the broadcasting list table 230. Alarm information generated from the network is stored in both the uncleared alarm table 243 and the listener tables 250 to 253 at the same time. The alarm managers 260 to 263 each read alarm information from their respective listener tables 250 to 253.

The alarm managers 260 to 263 can be configured to perform different tasks. The alarm managers 260 to 263 can display the alarm information that was read from the listener tables 250 to 253, can create e-mail messages containing the alarm information and transmit those e-mail messages over the Internet (not shown) or over other networks (not shown) or to a personal digital assistant (PDA) (not shown) or to other electronic devices (not shown), can transmit the alarm information in a fax message to a fax machine 510, and can transmit the alarm information in a pager message to a pager 500. For example, an operator at alarm manager 260 can press a key (not shown) to manually request that alarm manager 260 send a fax message to fax machine 510, using a modem (not shown) in alarm manager 260. Also, for example, the alarm manager 261 can be pre-programmed to send the alarm information to pager 500.

Figure 3:
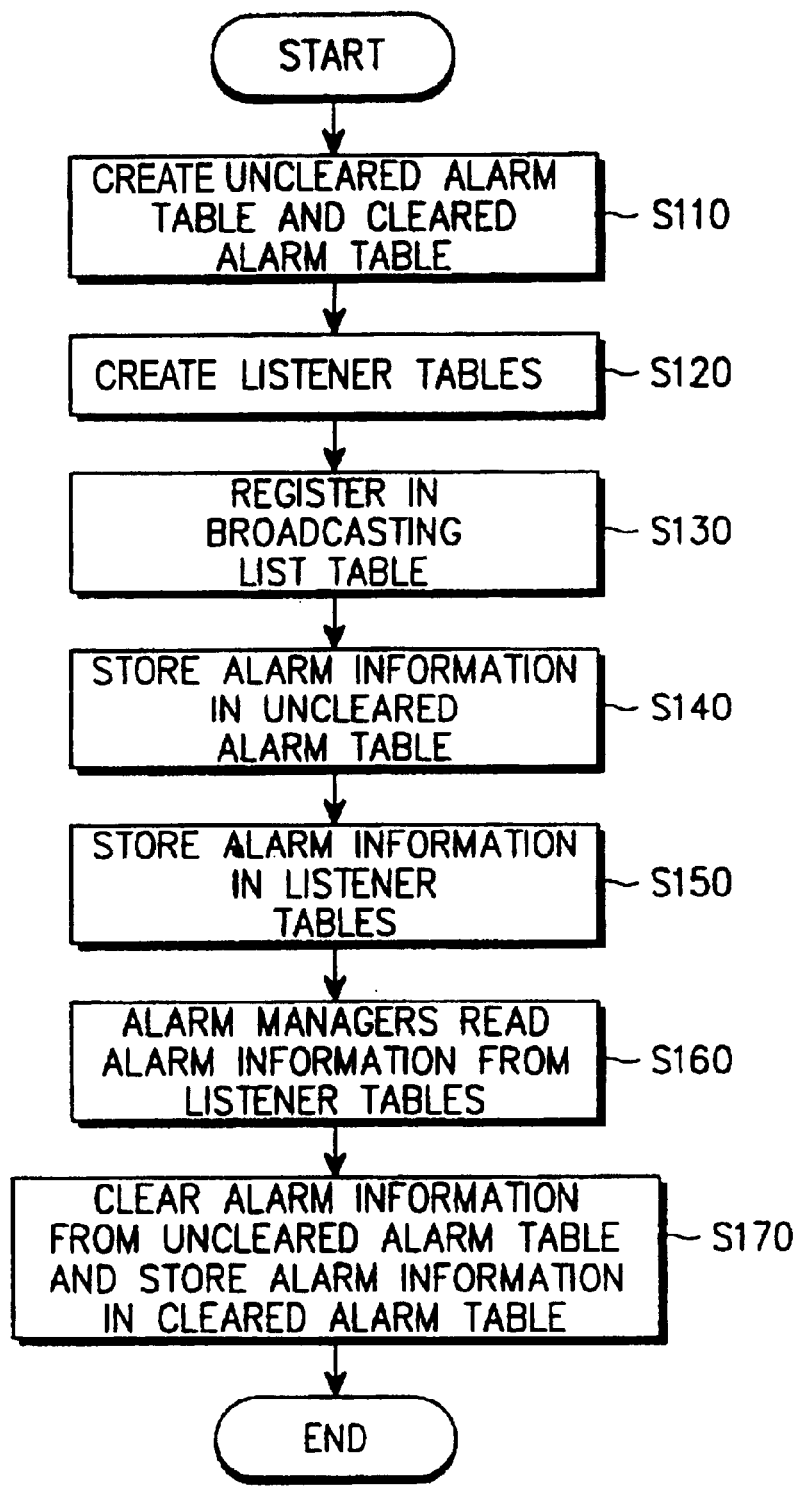
FIG. 3 is a flowchart illustrating an alarm management operation in accordance with the principles of the present invention.

FIG. 3 is a flowchart illustrating an alarm management operation according to the present invention. Referring to FIG. 2 and FIG. 3, the alarm management processor 220 creates the uncleared alarm table 243 and the cleared alarm table 245 within the alarm database 240 in step S110. Since the number of uncleared alarms is normally smaller than that of cleared alarms, the uncleared alarm table 243 should be smaller than the cleared alarm table 245.

In step S120, the alarm managers 260 to 263 connected to the alarm management host computer 200 secure memory space for use as listener tables in the host computer 200 using their process identifiers (IDs), and generate the listener tables 250 to 253. In step S130, the alarm managers 260 to 263 store the names of their listener tables 250 to 253 in the broadcasting list table 230. For example, the names of the listener tables 250 to 253 can be the process identifiers of the alarm managers 260 to 263. If one of the alarm managers 260 to 263 is inoperative, the name of its listener table is cleared from the broadcasting list table 230.

If an alarm is generated from the network, the alarm management processor 220 stores information about the alarm in the uncleared alarm table 243 in step S140. The step S140 will be described in detail hereinbelow.

Upon generation of an alarm from the network, the management information system (MIS) 110 transmits an alarm generation event message representing generation of the alarm to the host computer 200. An alarm event message generated from the management information system (MIS) 210 typically includes the fields shown in Table 1 below.

TABLE 1

Information fields of the alarm event message

| dn | alarm position |
|---|---|
| event type | alarm type |
| severity | alarm level |
| probable cause | alarm cause |

TABLE 1-continued

Information fields of the alarm event message

| additional text | alarm additional information |
|---|---|
| event time | alarm generation time |

The alarm management processor 220 parses the alarm generation event message received from the management information system (MIS)210 and generates alarm information in a predetermined form. Here, the alarm management processor 220 checks unused alarm identifiers (IDs) referring to the alarm identifier (ID) table 241 having a plurality of alarm identifiers stored therein to discriminate alarms generated from the network, assigns an unused alarm identifier to the alarm information, and stores the alarm information in the uncleared alarm table 243.

In step S150, the alarm management processor 220 stores the alarm information in the listener tables 250 to 253. The step S150 will be described in detail hereinbelow.

After generating the alarm information, the alarm management processor 220 determines whether each of the alarm managers 260 to 263 with the listener tables 250 to 253 registered in the broadcasting list table 230 operates normally. If processor 220 senses that an abnormal alarm manager exists, the name of its listener table is cleared from the broadcasting list table 230 in order to prevent unnecessary storage of the alarm information in the listener table of the abnormal alarm manager.

Then, the alarm management processor 220 simultaneously transmits all alarm information to the registered listener tables 250 to 253 referring to the broadcasting list table 230. Before the alarm information is stored in the listener tables 250 to 253, the alarm management processor 220 sets the listener tables 250 to 253 to a lock mode so that the alarm managers 260 to 263 cannot access the listener tables 250 to 253 during recording of the alarm information. When the recording operation is completed, the alarm management processor 220 releases the listener tables 250 to 253 from the lock mode to allow the alarm managers 260 to 263 to access the listener tables 250 to 253.

In step S160, the alarm managers 260 to 263 determine whether alarm information is stored in their respective listener tables 250 to 253 periodically or when an operator requests. If the stored alarm information exists, the alarm managers 260 to 263 read the alarm information, display or print the alarm information, and clear or remove the alarm information from the listener tables 250 to 253 to prevent re-reading of the alarm information. Also, the alarm managers 260 to 263 can transmit an e-mail message including the alarm information, transmit a pager message including the alarm information to a pager 500, and can transmit a fax message including the alarm information to a remote fax machine 510.

If the alarm is released, the alarm management processor 220 clears the alarm information from the uncleared alarm table 243 and stores the alarm information in the cleared alarm table 245 in step S170, which is described in detail below.

If the alarm is released in the network, the management information system (MIS) 210 transmits an alarm release event message representing release of the alarm to the alarm management host computer 200. The alarm release event message has the field "severity" set to "clear". The alarm management processor 220 parses the alarm release event message received from the management information system 210, looks up alarm information with a corresponding alarm identifier (ID) in the uncleared alarm table 243, automatically clears the alarm information from the uncleared alarm table 243, and inserts the alarm information in the cleared alarm table 245.

Unless information about a cleared alarm is automatically cleared due to problems, including a line abnormality between the management information system (MIS) 210 and the host computer 200, an operator can request the alarm management processor 220 to manually clear the alarm information using the alarm managers 260 to 263. Upon the request for a manual clear, the alarm management processor 220 clears the alarm information from the uncleared alarm table 243 and stores the alarm information in the cleared alarm table 245.

Figure 4:
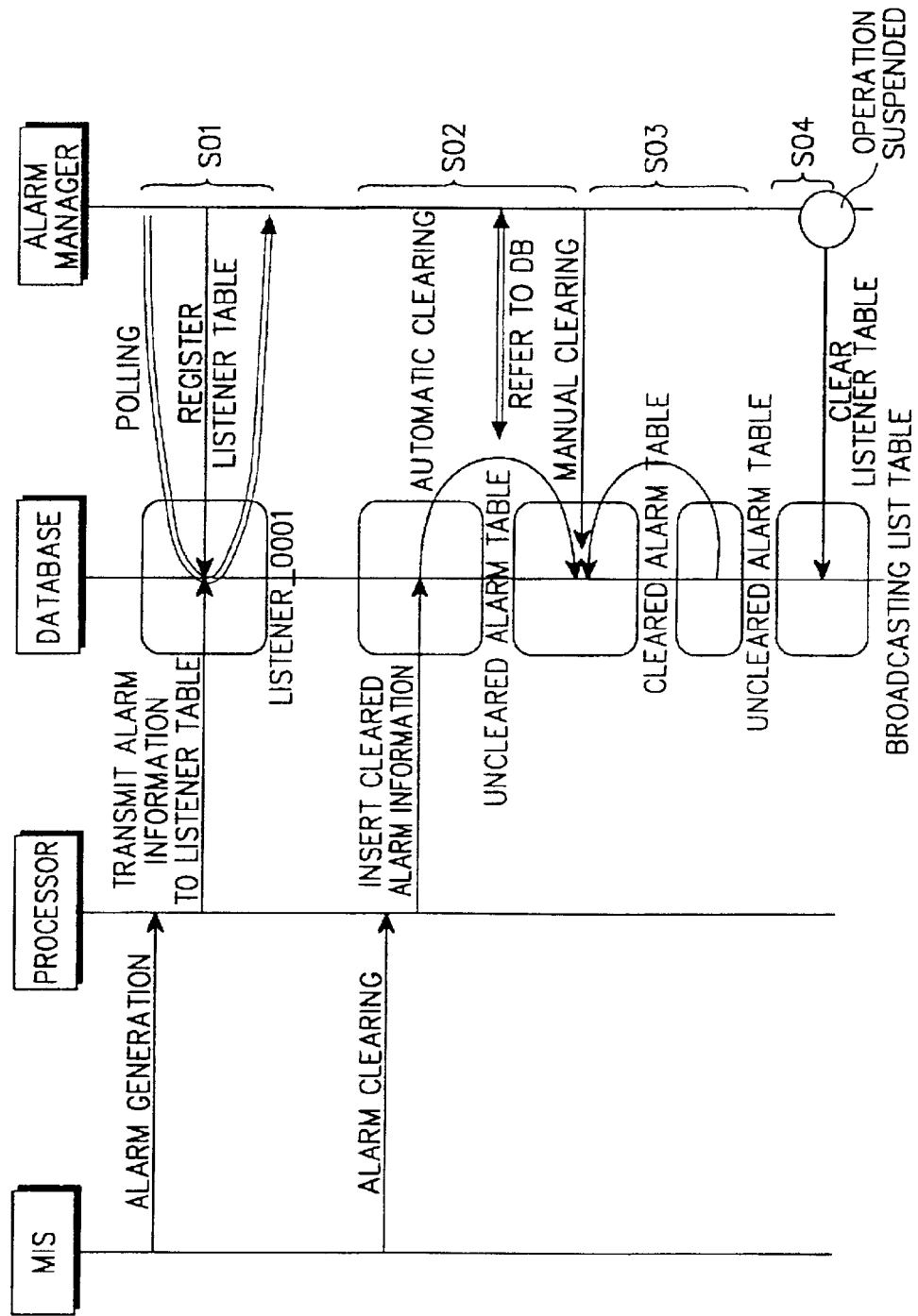
FIG. 4 is a detailed flowchart illustrating a recording and reading operation in tables in accordance with the principles of the present invention.

FIG. 4 is a flowchart illustrating a recording and reading operation in the tables according to the present invention. Referring to FIG. 2 and FIG. 4, in step S01, upon receipt of an alarm generation event message from the management information system 210, the alarm management processor 220 stores corresponding alarm information in a listener table 0001 (250) registered in the broadcasting list table 230. A corresponding alarm manager 260 reads the alarm information from the listener table 250 by polling periodically or every time an alarm is generated.

In step S02, upon receipt of an alarm clear event message from the management information system 210, the alarm management processor 220 looks up corresponding alarm information in the uncleared alarm table 243, clears the alarm information, and automatically inserts the alarm information into the cleared alarm table 245. The alarm manager 260, 261, 262 or 263, especially when it wants to review an alarm history, may monitor changes of alarm information in the uncleared alarm table 243 and the cleared alarm table 245, and may display them on a display.

In step S03, if the operation requests the alarm management processor 220 to manually clear alarm information using the alarm manager 260, 261, 262 or 263, the alarm management processor 220 looks up the alarm information in the uncleared alarm table 243, clears it from the uncleared alarm table 243, and stores it in the cleared alarm table 245.

In step 504, when the alarm management procedure ends due to power-off of the computer of the alarm manager 260, 261, 262 or 263 or termination of its application program, the alarm manager 260, 261, 262 or 263 requests the alarm management processor 220 to clear its listener table before the procedure ends. In response to the request, the alarm management processor 220 deletes the listener table.

Figure 5:
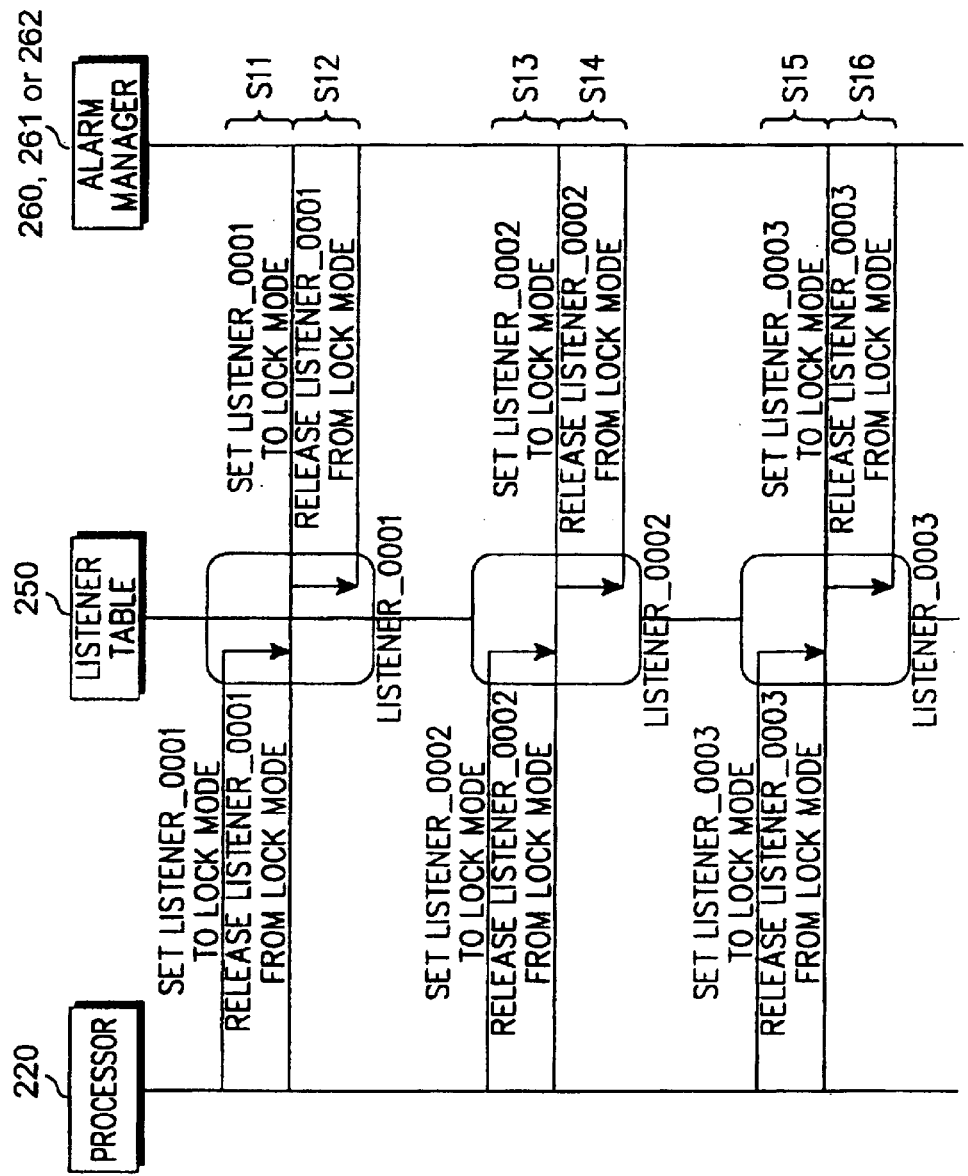
FIG. 5 is a flowchart illustrating a recording and reading operation in listener tables in accordance with the principles of the present invention.

FIG. 5 is a detailed flowchart illustrating a recording and reading operation in listener tables according to the present invention. It is assumed here that the names of listener tables registered in the broadcasting list table 230 are listener_0001, listener_0002, and listener_0003.

Referring to FIG. 5, the alarm management processor 220 sets listener_0001 in listener table 250 to a lock mode, records generated alarm information in listener_0001, and then releases it from the lock mode in step S11. The reason for the alarm management processor 220 to set listener_0001 to the lock mode is to prevent alarm manager 260 corresponding to listener_0001 from accessing listener_0001 during recording of the alarm information. In step S12, alarm manager 260 sets listener_0001 to the lock mode, reads the alarm information from listener_0001, and then releases it from the lock mode. The reason for alarm manager 260 to set listener_0001 to the lock mode is to prevent the alarm management processor 220 from accessing listener_0001 during reading of the alarm information.

Similarly, the alarm management processor 220 sets listener_0002 and listener_0003 to the lock mode, records the same alarm information in listener_0002 and listener_0003, and then releases them from the lock mode in steps S13 and S15. In steps S14 and S16, alarm managers 261 and 262 set listener_0002 and listener_0003, respectively, to the lock mode, read the alarm information from listener_0002 and listener_0003, respectively, and then release them from the lock mode.

In accordance with the present invention as described above, alarm information is readily looked up using distributed multiple tables for alarm management in a network management system, thereby saving time and effort on the part of an operator. Since a plurality of alarm managers have their respective listener tables, the problem of asynchronous access to alarm information is solved, and load during the access is decreased.

That is, the present invention is advantageous in that load is distributed due to distributed management of alarm data, a decrease in an alarm information search speed caused when accumulated alarm information reaches a certain level is prevented, heavy load during polling of alarm data is overcome, the efficiency and speed of alarm history reviewing are increased, and alarm managers can be managed by use of listener tables.

While the present invention has been illustrated by the description of embodiments thereof, and while the embodiments have been described in considerable detail, it is not the intention of the inventor to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the general inventive concept.

What is claimed is:

1. An apparatus, comprising:

a management information system for outputting alarm information corresponding to an alarm event and for outputting an alarm clear signal corresponding to an end of said alarm event;

an alarm management host for receiving said alarm information, said host having a broadcasting list data table, said host having an alarm database including a first data table and a second data table, said host having a plurality of memory spaces and a plurality of listener tables;

a processor coupled to said host, said processor storing said alarm information in said first data table when said alarm information is received by said host, said processor removing said alarm information from said first data table and storing said alarm information in said second data table when said alarm event is cleared, said alarm event being cleared when said alarm clear signal is output; and a plurality of alarm managers connected to said host, said plurality of alarm managers including a first alarm manager, said listener tables including a first listener table corresponding to said first alarm manager, each of said listener tables having a unique name listed in said broadcasting list data table, said first listener table having a first unique name;

said processor storing said alarm information in each of said listener tables listed in said broadcasting list data table;

after said storing of said alarm information in said listener tables is completed, said alarm managers reading said alarm information stored in said respective listener tables;

when said reading of said alarm information is performed, said alarm managers performing at least one of displaying said alarm information, printing said alarm information, transmitting an e-mail message including said alarm information, transmitting a pager message including said alarm information, and transmitting a facsimile message including said alarm information;

when said reading of said alarm information is performed, said alarm managers removing said alarm information from said listener tables to prevent re-reading of said alarm information;

when said management information system performs said outputting of said alarm clear signal, said processor performing said removing of said alarm information from said first data table and performing said storing of said alarm information in said second data table.

2. The apparatus of claim 1, wherein, when said first alarm manager is being powered off, said first alarm manager requests that said processor remove said first listener table, said processor removing said first listener table in response to said request of said first alarm manager.

3. The apparatus of claim 1, said processor performing said removing of said alarm information from said first data table and performing said storing of said alarm information in said second data table in response to an operator request.

4. The apparatus of claim 1, said alarm managers monitoring changes in said alarm information in said first and second data tables, and displaying results of said monitoring.

5. The apparatus of claim 1, said alarm managers performing said reading periodically.

6. The apparatus of claim 1, said alarm managers performing said reading in response to an operator request.

7. The apparatus of claim 1, said alarm managers performing said reading in response to said alarm information being stored in said listener tables.

8. The apparatus of claim 1, said alarm managers performing said reading in response to said alarm event.

9. The apparatus of claim 1, said listed listener tables being set to a lock mode before said processor performs said storing of said alarm information in said listed listener tables, said lock mode preventing said alarm managers from accessing said listed listener tables during said storing of said alarm information in said listed listener tables.

10. The apparatus of claim 9, said processor performing said setting of said listed listener tables in said lock mode.

11. The apparatus of claim 9, said lock mode being released after said storing of said alarm information in said listed listener tables is completed.

12. The apparatus of claim 9, said alarm managers performing said reading periodically by polling.

13. The apparatus of claim 1, said first listener table being set to a lock mode before said first alarm manager performs said reading of said alarm information stored in said first listener table, said lock mode preventing said processor from accessing said first listener table during said reading of said alarm information in said first listener table.

14. The apparatus of claim 13, said first alarm manager performing said setting of said first listener table in said lock mode.

15. The apparatus of claim 13, said lock mode being released after said reading of said alarm information in said first listener table is completed.

16. The apparatus of claim 1, said processor performing said storing of said alarm information in each of said listed listener tables substantially simultaneously.

17. The apparatus of claim 1, said alarm information including at least one of an alarm event position, an alarm event type, an alarm event level, an alarm event cause, additional alarm event information, and an alarm event time.

18. The apparatus of claim 1, said processor assigning an unused alarm identifier to said alarm information when storing said alarm information in said first data table.

19. The apparatus of claim 1, said processor sensing whether said plurality of alarm managers are operating correctly after said alarm event is detected and before said processor stores said alarm information in each of said listener tables listed in said broadcasting list data table.

20. The apparatus of claim 9, said first unique name being removed from said broadcasting list data table when said first alarm manager is not operating correctly after said processor performs said sensing and before said processor stores said alarm information in each of said listener tables listed in said broadcasting list data table.

21. The apparatus of claim 1, said processor creating said first and second data tables in said alarm database.

22. The apparatus of claim 1, said first data table being smaller than said second data table.

23. The apparatus of claim 1, said first data table being used for storing said alarm information when said alarm event is not cleared, said second data table being used for storing said alarm information when said alarm event is cleared.

24. The apparatus of claim 1, said plurality of alarm managers securing said memory spaces in said host and creating said listener tables in said secured memory spaces.

25. The apparatus of claim 1, each respective one of said alarm managers securing a respective memory space from among said memory spaces, each respective one of said alarm managers creating one respective listener table in said secured respective memory space.

26. An apparatus for managing an alarm event occurring in a network, said apparatus comprising:

a management information system for outputting alarm information corresponding to the alarm event;

an alarm management host computer for managing said alarm information received from said management information system; and a plurality of alarm managers connected to said alarm management host computer, said plurality of alarm managers reading said alarm information when said alarm information is not cleared, said plurality of alarm managers including a first alarm manager;

said alarm management host computer having a first data table for storing said alarm information when said alarm information is not cleared, and a second data table for storing said alarm information when said alarm information is cleared, said alarm management host computer storing said alarm information in said first data table when said alarm information is not cleared, said alarm management host computer removing said alarm information from said first data table and storing said alarm information in said second data table when said alarm information is cleared, said alarm information being cleared when said alarm event ends;

said alarm management host computer including a broadcasting list data table and a plurality of listener data tables including a first listener data table, each one of said listener data tables having a unique name, said broadcasting list data table storing each unique name of each one of said listener data tables, each respective one of said listener data tables corresponding to a respective one of said alarm managers.

27. The apparatus of claim 26, said alarm information being not cleared when said alarm event has not ended, said alarm information being cleared when said alarm event ends.

28. The apparatus of claim 27, said management information system outputting an alarm clear signal corresponding to said end of said alarm event.

29. The apparatus of claim 28, said alarm management host computer clearing said alarm information in response to said alarm clear signal, said alarm management host computer removing said alarm information from said first data table and storing said alarm information in said second data table in response to said alarm clear signal.

30. The apparatus of claim 26, said name of said first listener data table being removed from said broadcasting list data table when said first alarm manager is detected as not operating normally, said first alarm manager corresponding to said first listener data table.

31. The apparatus of claim 30, said alarm information being stored in each one of said plurality of listener data tables listed in said broadcasting list data table when said alarm information is stored in said first data table, said alarm information stored in each one of said listed listener data tables being read by said corresponding alarm managers.

32. The apparatus of claim 31, said alarm managers reading said alarm information from said listener data tables by polling.

33. The apparatus of claim 26, said alarm management host computer transmitting said alarm information to said alarm managers in response to a request from said alarm managers.

34. An alarm management method for an alarm management processor connected to a plurality of alarm managers, said method comprising the steps of:
creating an uncleared alarm table for storing alarm information corresponding to an alarm event that is generated from a network and that is not cleared, and creating a cleared alarm table for storing alarm information corresponding to an alarm event that is cleared;
creating a plurality of listener tables corresponding to the alarm managers;
registering the listener tables in a broadcasting list table;
storing alarm information in the uncleared alarm table when the alarm event is generated from the network;
storing the alarm information in the listener tables registered in the broadcasting list table;
reading the alarm information from the listener tables, said reading being performed by the alarm managers; and
when the alarm event is released, clearing the alarm information from the uncleared alarm table and storing the alarm information in the cleared alarm table.

35. The method of claim 34, further comprising the step of:
displaying the alarm information and then clearing the alarm information from the listener tables, said displaying and clearing being performed by the alarm managers.

36. The method of claim 35, said reading of the alarm information from the listener tables being performed by the alarm managers using polling.

37. The method of claim 36, storing of alarm information in the listener tables further comprising the steps of:
setting the listener tables to a lock mode;
storing the alarm information in the listener tables; and
releasing the listener tables from the lock mode.

38. The method of claim 34, further comprising the steps of:
determining whether the alarm managers corresponding to the listener tables registered in the broadcasting list table are normally operating when the alarm event is generated from the network; and
removing, from the broadcasting list table, the listener tables corresponding to any alarm managers that are not normally operating.

39. The method of claim 34, said reading of the alarm information from the listener tables further comprising the steps of:
setting the listener tables to a lock mode, said setting being performed by the alarm managers;
reading the alarm information from the listener tables, said reading being performed by the alarm managers; and
releasing the listener tables from the lock mode, said releasing being performed by the alarm managers.

40. A method, comprising:
outputting alarm information corresponding to an alarm event and outputting an alarm clear signal corresponding to an end of said alarm event, said outputting being performed by a network;
receiving said alarm information, said receiving being performed by a host, said host having a broadcasting list data table, a plurality of memory spaces, a plurality of listener tables, and an alarm database including a first data table and a second data table;
when said alarm information is received by said host, storing said alarm information in said first data table;
when said alarm event is cleared, removing said alarm information from said first data table and storing said alarm information in said second data table, said alarm event being cleared in response to said outputting of said alarm clear signal;
connecting a plurality of alarm managers to said host, said plurality of alarm managers including a first alarm manager, said listener tables including a first listener table corresponding to said first alarm manager, each of said listener tables having a unique name listed in said broadcasting list data table, said first listener table having a first unique name;
storing said alarm information in each of said listener tables listed in said broadcasting list data table;
after said storing of said alarm information in said listener tables is completed, reading said alarm information stored in said listener tables, said reading of said alarm information stored in said listener tables corresponding to each one of said respective alarm managers reading said alarm information stored in each one of said respective listener tables;
when said reading of said alarm information is performed by said alarm managers, performing at least one of displaying said alarm information, printing said alarm information, transmitting an e-mail message including said alarm information, transmitting a pager message including said alarm information, and transmitting a facsimile message including said alarm information;
when said reading of said alarm information is performed, removing said alarm information from said listener tables to prevent re-reading of said alarm information; and
when said management information system performs said outputting of said alarm clear signal, performing said removing of said alarm information from said first data table and performing said storing of said alarm information in said second data table.

41. The method of claim 40, further comprising the step of:
when said first alarm manager is being powered off, requesting that said first listener table be removed from said broadcasting list data table, and removing said first listener table in response to said requesting.

42. The method of claim 40, said removing of said alarm information from said first data table and said storing of said alarm information in said second data table being performed in response to an operator request.

43. The method of claim 40, further comprising the step of monitoring changes in said alarm information in said first and second data tables, and displaying results of said monitoring.

44. The method of claim 40, said reading of said alarm information being performed by said alarm managers periodically.

45. The method of claim 40, said reading of said alarm information being performed by said alarm managers in response to an operator request.

46. The method of claim 40, said reading of said alarm information being performed by said alarm managers in response to said alarm event.

47. The method of claim 40, said listed listener tables being set to a first lock mode before said storing of said alarm information in said listed listener tables, said first lock mode preventing said alarm managers from accessing said listed listener tables during said storing of said alarm information in said listed listener tables.

48. The method of claim 47, said first lock mode being released after said storing of said alarm information in said listed listener tables is completed.

49. The method of claim 48, said first listener table being set to a second lock mode before said first alarm manager performs said reading of said alarm information stored in said first listener table, said second lock mode allowing only said first alarm manager to access said first listener table during said reading of said alarm information in said first listener table.

50. The method of claim 49, said setting of said first listener table in said second lock mode being performed by said first alarm manager.

51. The method of claim 50, further comprising the step of releasing said second lock mode after said reading by said first alarm manager of said alarm information in said first listener table is completed.

52. The method of claim 51, said storing of said alarm information in said listed listener tables being performed substantially simultaneously.

53. The method of claim 52, said alarm information including at least one of an alarm event position, an alarm event type, an alarm event level, an alarm event cause, additional alarm event information, and an alarm event time.

54. The method of claim 53, further comprising the step of assigning an unused alarm identifier to said alarm information when storing said alarm information in said first data table.

55. The method of claim 54, further comprising the step of sensing whether said plurality of alarm managers are operating correctly after said alarm event is detected and before said storing of said alarm information in said listener tables listed in said broadcasting list data table.

56. The method of claim 55, further comprising the step of removing said first unique name from said broadcasting list data table when said first alarm manager is not operating correctly after said performing of said sensing and before storing of said alarm information in said listener tables listed in said broadcasting list data table.

57. The method of claim 56, said first data table being used for storing said alarm information when said alarm event is not cleared, said second data table being used for storing said alarm information when said alarm event is cleared.

58. The method of claim 40, said alarm information including at least one of an alarm event position, an alarm event type, an alarm event level, an alarm event cause, additional alarm event information, and an alarm event time.

59. The method of claim 40, further comprising the step of assigning an unused alarm identifier to said alarm information when storing said alarm information in said first data table.

60. The method of claim 40, further comprising the step of sensing whether said plurality of alarm managers are operating correctly after said alarm event is detected and before said storing of said alarm information in said listener tables listed in said broadcasting list data table.

61. The method of claim 40, further comprising the step of removing said first unique name from said broadcasting list data table when said first alarm manager is not operating correctly after said performing of said sensing and before storing of said alarm information in said listener tables listed in said broadcasting list data table.

62. The method of claim 40, said first data table being used for storing said alarm information when said alarm event is not cleared, said second data table being used for storing said alarm information when said alarm event is cleared.

63. An alarm management method for a network management system, said method comprising the steps of:
creating an uncleared alarm table for storing alarm information that is generated from a network and that is not cleared, and creating a cleared alarm table for storing alarm information that is cleared;
storing first alarm information in the uncleared alarm table when the first alarm information is generated from the network, said first alarm information corresponding to an alarm event;
when the alarm event ends, removing said first alarm information from the uncleared alarm table and storing the first alarm information in the cleared alarm table;
writing said first alarm information from said uncleared alarm table to a plurality of listener tables;
reading said first alarm information from said listener tables using a plurality of alarm managers; and
displaying said first alarm information read from said listener tables using said plurality of alarm managers.

64. An alarm management method for managing an alarm in a network, said method comprising the steps of:
creating a plurality of listener data tables for storing information, each of said listener data tables corresponding to a respective alarm manager selected from among a plurality of alarm managers, each one of said listener data tables having a unique name;
detecting whether said alarm managers are operating normally;
registering, in a broadcasting list data table, said unique names identifying said listener data tables corresponding to said alarm managers that are detected to be operating normally;
when an alarm event is generated in said network, writing first alarm information from an uncleared alarm table into said listener data tables corresponding to said unique names registered in said broadcasting list data table; and
reading and displaying said first alarm information from said listener data tables by means of said alarm managers that are detected to be operating normally.

65. The method of claim 64, further comprising the steps of:
periodically detecting whether said alarm managers are operating normally; and
removing, from said broadcasting list data table, said names of listener data tables corresponding to said alarm managers that are detected to be not operating normally.

* * * * *